(12) United States Patent
Kashiwagi et al.

(10) Patent No.: US 8,498,044 B2
(45) Date of Patent: Jul. 30, 2013

(54) AMPLIFICATION OPTICAL FIBER, AND OPTICAL FIBER AMPLIFIER AND RESONATOR USING THE SAME

(75) Inventors: Masahiro Kashiwagi, Sakura (JP); Kensuke Shima, Sakura (JP)

(73) Assignee: Fujikura Ltd., Tokyo (JP)

(*) Notice: Subject to any disclaimer, the term of this patent is extended or adjusted under 35 U.S.C. 154(b) by 386 days.

(21) Appl. No.: 12/940,328

(22) Filed: Nov. 5, 2010

(65) Prior Publication Data

US 2011/0149383 A1 Jun. 23, 2011

(30) Foreign Application Priority Data

Dec. 22, 2009 (JP) ................................ 2009-291119

(51) Int. Cl.
*H04B 10/17* (2011.01)
*H01S 3/067* (2006.01)

(52) U.S. Cl.
USPC ............................................ 359/341.1; 372/6

(58) Field of Classification Search
USPC ............................................ 359/341.1; 372/6
See application file for complete search history.

(56) References Cited

U.S. PATENT DOCUMENTS

| | | | |
|---|---|---|---|
| 5,121,460 A | | 6/1992 | Tumminelli et al. |
| 5,708,669 A | * | 1/1998 | DiGiovanni et al. ............. 372/6 |
| 5,818,630 A | | 10/1998 | Fermann et al. |
| 5,966,481 A | * | 10/1999 | Jolley et al. ...................... 385/28 |
| 6,483,974 B1 | * | 11/2002 | Waarts ........................... 385/123 |
| 6,687,046 B2 | * | 2/2004 | Leplingard et al. ........ 359/337.4 |
| 6,965,469 B2 | * | 11/2005 | Avizonis et al. ............ 359/341.1 |
| 7,542,488 B2 | * | 6/2009 | Schlueter et al. .................. 372/6 |
| 7,925,128 B2 | * | 4/2011 | Ramachandran ............... 385/27 |
| 2002/0030881 A1 | * | 3/2002 | Nilsson et al. ............. 359/341.1 |
| 2003/0016441 A1 | * | 1/2003 | Leplingard et al. ........ 359/341.1 |
| 2004/0218635 A1 | * | 11/2004 | Schlueter et al. .................. 372/6 |
| 2010/0002992 A1 | * | 1/2010 | Ramachandran ............... 385/27 |
| 2010/0103959 A1 | * | 4/2010 | Digiovanni et al. .............. 372/6 |

FOREIGN PATENT DOCUMENTS

| | | |
|---|---|---|
| JP | 2003-008114 A | 1/2003 |
| WO | 03/067723 A1 | 8/2003 |

OTHER PUBLICATIONS

Nilsson, J. et al.; "Yb3+-Ring -doped Fiber for high-energy pulse amplification"; Optics Letter, vol. 22, No. 14, Jul. 15, 1997, pp. 1092-1094.

Quimby, Richard S. et al.; "Yb3+Ring Doping in High-Order-Mode Fiber for High-Power 977-nm Lasers and Amplifiers"; IEEE Journal of Selected Topics in Quantum Electronics, (Jan. 2009), vol. 15, No. 1, pp. 12-19.

* cited by examiner

*Primary Examiner* — Eric Bolda
(74) *Attorney, Agent, or Firm* — Westerman, Hattori, Daniels & Adrian, LLP (57) ABSTRACT

There are provided an amplification optical fiber, and an optical fiber amplifier and a resonator using the same capable of outputting light of high beam quality even when a higher-order mode that is axially symmetric is excited in addition to LP01 mode.

An amplification optical fiber 50 includes: a core 51; a clad 52 coating the core 51; and an outer clad 53 coating the clad 52, wherein the core 51 has a larger refractive index than the clad 52, the core 51 allows light having a predetermined wavelength to propagate in at least LP01 mode and LP02 mode, and in the core 51, active element that stimulates to emit light of the predetermined wavelength is doped at a higher concentration at a position where an intensity of the LP02 mode becomes zero than center of the core 51.

73 Claims, 8 Drawing Sheets

AMPLIFICATION OPTICAL FIBER, AND OPTICAL FIBER AMPLIFIER AND RESONATOR USING THE SAME

TECHNICAL FIELD

The invention relates to an amplification optical fiber, and an optical fiber amplifier and a resonator using the same, and particularly to an amplification optical fiber, and an optical fiber amplifier and a resonator using the same capable of improving beam quality.

BACKGROUND ART

In a fiber laser device used in a processing machine, a medical device and the like, an optical fiber amplifier for amplifying light generated by a seed light source such as a laser oscillator (MO: Master Oscillator) using an amplification optical fiber is typically used.

A double clad fiber having a core doped with active element such as rare earth element may be used as an amplification optical fiber. The double clad fiber may be a double clad fiber that allows only single mode light to propagate through a core thereof, or a double clad fiber that allows multi mode light to propagate through a core thereof. In the double clad fiber that allows only single mode light to propagate through the core, as the core generally has a small diameter, density of light propagating through the core may be too high in order to obtain a high laser output. In this case, energy of light is transferred to have a wavelength that is not desired due to a nonlinear optical effect so that an expected laser output cannot be obtained. Therefore, along with the recent demand for an optical fiber amplifier to have a high power, an optical fiber amplifier using a double clad fiber that allows multi mode light to propagate through a core thereof has received attention.

Patent Document 1 discloses that LP01 mode can be mainly amplified even by an amplification double clad fiber that allows multi mode light to propagate by providing a mode converter that excites only LP01 mode of light propagating through the core of the amplification double clad fiber that allows multi mode light to propagate. Further, Patent Document 1 suggests that LP01 mode can be efficiently amplified compared to a higher-order mode due to an effect called gain waveguide by using an amplification optical fiber, in which active element is doped into the central portion of a core of a double clad fiber and active element is not doped into the outer circumference portion of the core. Patent Document 2 discloses an idea for attenuating needless higher-order modes by using an amplification optical fiber, in which active element is doped into the central portion of a core of a double clad fiber and absorbing element which absorbs light is doped into the outer circumference portion of the core.
[Patent Document 1] U.S. Pat. No. 5,818,630
[Patent Document 2] U.S. Pat. No. 5,121,460

SUMMARY OF INVENTION

However, if a double clad fiber that allows multi mode light to propagate is used as an amplification optical fiber, a higher-order mode such as LP02 mode is also excited in addition to LP01 mode (fundamental mode) in propagating light. The existence of such a higher-order mode has an effect that output light is hardly focused or the like so that beam quality of output light is lowered.

In addition, in order to excite only LP01 mode using the mode converter described in Patent Document 1, a shape of a mode field of input seed light and a shape of a mode field of LP01 mode in light propagating through the amplification double clad fiber have to be matched. From the knowledge of the inventors, it is relatively easy not to excite LP11 mode that is an asymmetric mode but it is difficult not to excite LP02 mode that is an axially symmetric mode among higher-order modes. In addition, a ratio at which such a higher-order mode is amplified is generally higher than that at which LP01 mode is amplified even when light of such a higher-order mode has a slight power upon being input, or when light of such a higher-order mode is generated in the amplification optical fiber, and thus light of such a higher-order mode is highly included in output light, unfortunately. Particularly, it has been found that as a light amplification factor increases, a ratio at which such a higher-order mode is amplified increases so that beam quality of output light tends to be lowered.

In addition, even when a higher-order mode that is axially symmetric is excited, the mode is expected to be attenuated by using an optical fiber amplifier disclosed in Patent Document 2, but there has been a problem that an attenuating material is added to an amplifying medium so that a gain for LP01 mode is also lowered.

Therefore, an object of the invention is to provide an amplification optical fiber, and an optical fiber amplifier and a resonator using the same capable of outputting light of high beam quality even when a higher-order mode that is axially symmetric is excited in addition to LP01 mode.

The inventors have devoted themselves to studying why LP02 mode may be amplified at a high amplification factor and light having low beam quality may be output by the optical fiber amplifier disclosed in Patent Document 1. As a result, the inventors have reached a conclusion that LP02 mode has a high intensity at the central portion of the core of the double clad fiber, and thus LP02 mode is also amplified even when active element is doped into only the central portion of the core. Under this situation, the inventors have further devoted themselves to the study so as to make the invention.

Specifically, an amplification optical fiber according to the invention includes: a core; a clad coating the core; and an outer clad coating the clad, wherein the core has a larger refractive index than the clad, the core allows light having a predetermined wavelength to propagate in at least LP01 mode and LP02 mode, and in the core, active element that stimulates to emit light of the predetermined wavelength is doped at a higher concentration at a position where an intensity of the LP02 mode becomes zero than center of the core.

With such an amplification optical fiber, light including LP01 mode (fundamental mode) is input to the core, and pumping light is input to the clad so that the light including LP01 mode is amplified by the pumping light. At this time, amplification of LP02 mode that is an axially symmetric higher-order mode can be suppressed even when the light including LP01 mode that is input to the core also includes LP02 mode or when LP02 mode is excited in the amplification optical fiber. Accordingly, light of high beam quality can be output. The inventors are of the opinion that the reason of the higher output ratio of light of LP01 mode to light of LP02 compared to a case where a core is doped with active element at uniform concentration is that active element is doped at a higher concentration at the positions where an intensity of LP02 mode becomes zero than the concentration in the center of the core so that an amplification factor of LP02 mode can be suppressed, and thus a ratio of the power of LP01 mode to the whole power of the output light is increased to improve beam quality.

An amplification optical fiber according to the invention includes: a core; a clad coating the core; and an outer clad coating the clad, wherein the core has a larger refractive index than the clad, the core allows light having a predetermined wavelength to propagate in at least LP01 mode and LP02 mode, and in the core, active element that stimulates to emit light of the predetermined wavelength is doped at a lower concentration at center of the core than a position where an intensity of the LP02 mode becomes zero.

With such an amplification optical fiber, LP02 mode that is an axially symmetric higher-order mode can be also suppressed so that light of high beam quality can be output even when the light including LP01 mode that is input to the core also includes LP02 mode or when LP02 mode is excited in the amplification optical fiber.

In addition, in the amplification optical fiber described above, it is preferable that the active element not be doped into the center of the core.

With such an amplification optical fiber, LP01 mode is amplified more than LP02 mode so that output light can be of higher beam quality.

In the amplification optical fiber described above, it is preferable that the active element be doped at a lower concentration at an outer circumference region of the core than a position where an intensity of the LP02 mode becomes zero.

With such an amplification optical fiber, an amplification factor of LP02 mode can be also suppressed compared to an amplification factor of LP01 mode so that output light can be of higher beam quality.

In addition, in the amplification optical fiber described above, it is preferable that the active element not be doped into the outer circumference of the core.

With such an amplification optical fiber, amplification of LP02 mode can be further suppressed so that output light can be of high beam quality.

It is preferable that the active element be doped into a region where the LP01 mode has a higher intensity than the LP02 mode at a higher concentration compared to a region where the LP01 mode has a lower intensity than the LP02 mode.

With such an amplification optical fiber, amplification of LP02 mode can be suppressed so that output light can be of higher beam quality.

In the amplification optical fiber described above, it is preferable that the core not allow higher-order mode of LP03 or higher in light having the predetermined wavelength to propagate.

With such an amplification optical fiber, higher-order modes of LP03 or higher is not amplified and output so that light of higher beam quality can be output.

An optical fiber amplifier according to the invention includes the amplification optical fiber described above; a seed light source configured to input seed light including LP01 mode to the amplification optical fiber; and a pumping light source configured to output pumping light that pumps the active element of the amplification optical fiber.

With such an optical fiber amplifier, LP01 mode is amplified at a higher amplification factor than LP02 mode in input seed light in the amplification optical fiber even when LP02 mode is input to the amplification optical fiber, or when LP02 mode is generated in the amplification optical fiber so that light of high beam quality can be output.

In addition, in the optical fiber amplifier described above, it is preferable that seed light input to the amplification optical fiber excite only an axially symmetric mode in the amplification optical fiber.

With such an optical fiber amplifier, axially asymmetric higher-order mode does not propagate through the amplification optical fiber so that axially asymmetric higher-order mode is not amplified and output, and thus light of high beam quality that can be focused easily can be output.

In addition, in the optical fiber amplifier described above, it is preferable that seed light input to the amplification optical fiber be single mode light.

With such an optical fiber amplifier, axially asymmetric higher-order mode does not propagate through the amplification optical fiber so that axially asymmetric higher-order mode is not amplified and output, and thus light of high beam quality that can be focused easily can be output.

A resonator according to the invention includes: the amplification optical fiber described above; a pumping light source configured to output pumping light that pumps the active element of the amplification optical fiber; a first FBG (Fiber Bragg Grating) provided on one side of the amplification optical fiber and configured to reflect light having at least a part of wavelengths in light emitted by the active element that is pumped by the pumping light; and a second FBG provided on the other side of the amplification optical fiber and configured to reflect light having the same wavelength as light reflected by the first FBG at a lower reflectance than the first FBG.

With such a resonator, since LP01 mode is more highly amplified than LP02 mode while light propagates through the core of the amplification optical fiber as light resonates, light including light of LP01 mode having a higher intensity than light of LP02, which is light of higher beam quality can be output compared to a case where a fiber having a core doped with active element at uniform concentration is used.

As described above, an amplification optical fiber, and an optical fiber amplifier and a resonator using the same capable of outputting light of high beam quality at a high intensity can be provided according to the invention.

BEST MODE FOR CARRYING OUT THE INVENTION

Hereinafter, preferable embodiments of an amplification optical fiber, and an optical fiber amplifier and a resonator according to the invention will be described in detail referring to the drawings.

First Embodiment

Figure 1:
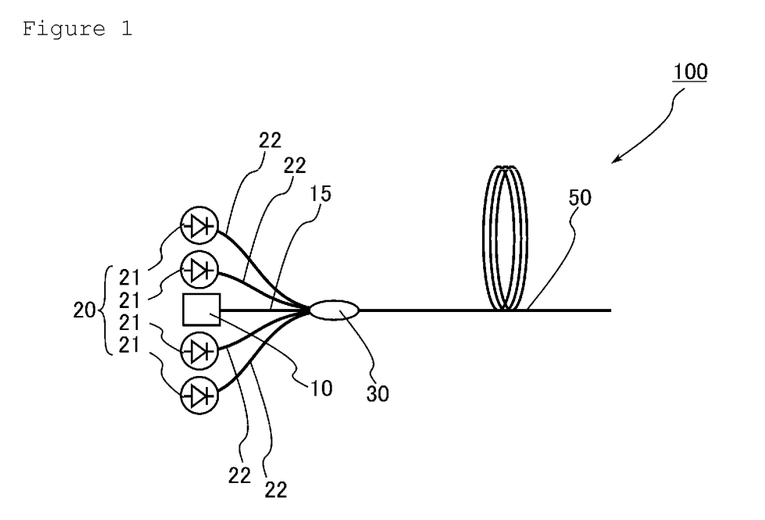
FIG. 1 is a view showing an optical fiber amplifier according to a first embodiment of the invention.

FIG. 1 is a view showing an optical fiber amplifier according to a first embodiment of the invention.

As shown in FIG. 1, an optical fiber amplifier 100 according to the embodiment includes, as main components: a seed light source 10 configured to output seed light; a pumping light source 20 configured to output pumping light; an optical combiner 30 into which the seed light and the pumping light are input; and an amplification optical fiber 50 into which seed light and pumping light output from the optical combiner 30 are input.

The seed light source 10 may be configured by a semiconductor laser device, or a fiber laser device of fabry-perot type or fibering type, for example. The seed light source 10 is configured to output light including LP01 mode from the optical fiber. As the seed light source for outputting light including LP01 mode, a typical semiconductor laser device or a fiber laser device may be used. The seed light output from the seed light source 10 may be laser light having a wavelength of 1070 nm, for example, but not particularly limited thereto as long as the seed light includes LP01 mode.

The output light from the seed light source 10 is output from a single mode fiber 15 configured by a core and a clad coating the core. The single mode fiber 15 allows seed light output from the seed light source 10 to propagate as single mode light of LP01 mode. The configuration of the single mode fiber 15 is not particularly limited, but a diameter of the core may be set to 10 μm and a difference in relative refractive index between the core and the clad may be set to 0.13% if the wavelength of the seed light is 1070 nm as described above, for example.

The pumping light source 20 may be configured by a plurality of laser diodes 21. The laser diodes 21 are fabry-perot type semiconductor laser diodes of GaAs-based semiconductor that output light having the center wavelength of 915 nm, for example in the embodiment. The respective laser diodes 21 of the pumping light source 20 are connected to multi mode fibers 22, and pumping light output from each of the laser diodes 21 propagates through the multi mode fiber 22 as multi mode light.

The optical combiner 30 to which the multi mode fibers 22 and the single mode fiber 15 are connected is configured by the single mode fiber 15 and the multi mode fibers 22 arranged around the single mode fiber 15 that are melted and stretched to be integrated, and the optical combiner 30 is optically connected to the amplification optical fiber 50.

Figure 2:
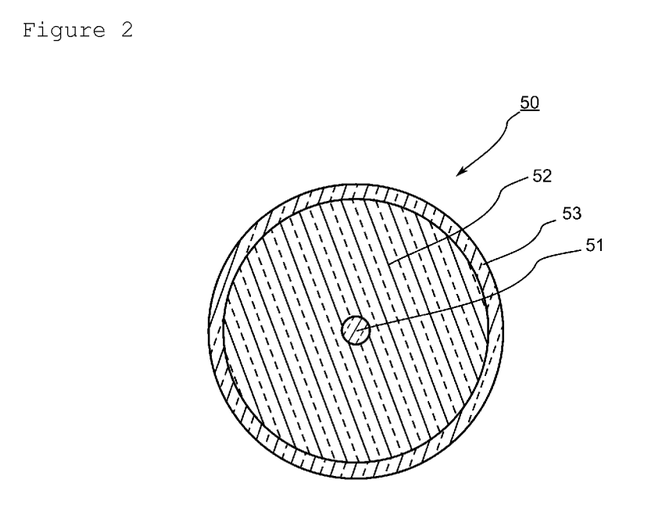
FIG. 2 is a view showing a structure of a cross-section perpendicular to a longitudinal direction of an amplification optical fiber shown in FIG. 1.

FIG. 2 is a view showing a structure of a cross-section perpendicular to a longitudinal direction of the amplification optical fiber 50. As shown in FIG. 2, the amplification optical fiber 50 includes: a core 51; a clad 52 coating the core 51; and an outer clad 53 coating the clad 52. The clad 52 is configured to have a smaller refractive index than the core 51 and the outer clad 53 is configured to have a smaller refractive index than the clad 52. For example, the difference in relative refractive index between the core 51 and the clad 52 is set to 0.15% in the embodiment. A diameter of the core 51 is set to 30 μm, for example, an outer diameter of the clad 52 is set to 420 μm, for example, and an outer diameter of the outer clad 53 is set to 440 μm, for example. Silica doped with element that increases a refractive index of silica such as aluminum may be used as a material for the core 51, and ytterbium (Yb) that is active element pumped by the pumping light output from the pumping light source 20 is doped into at least a part of a region of the core 51. Other than ytterbium (Yb), rare earth element such as neodymium (Nd) or erbium (Er) may be used as such active element. Silica without any dopant, for example, may be used as a material for the clad 52, and UV curable resin, for example, may be used as a material for the outer clad 53.

Due to the difference in refractive index between the core 51 and the clad 52 as described above, light having a predetermined wavelength from the seed light source is confined in the core 51 and propagates. As a mode of light propagating through the core 51, LP02 exists as a higher-order mode in addition to the fundamental mode LP01. In the amplification optical fiber 50 according to the embodiment, a wavelength of light of the seed light source, a size of the core 51 and the clad 52, and the difference in the relative refractive index between the core 51 and the clad 52 are set such that higher-order modes of LP03 or higher do not propagate.

Figure 3:
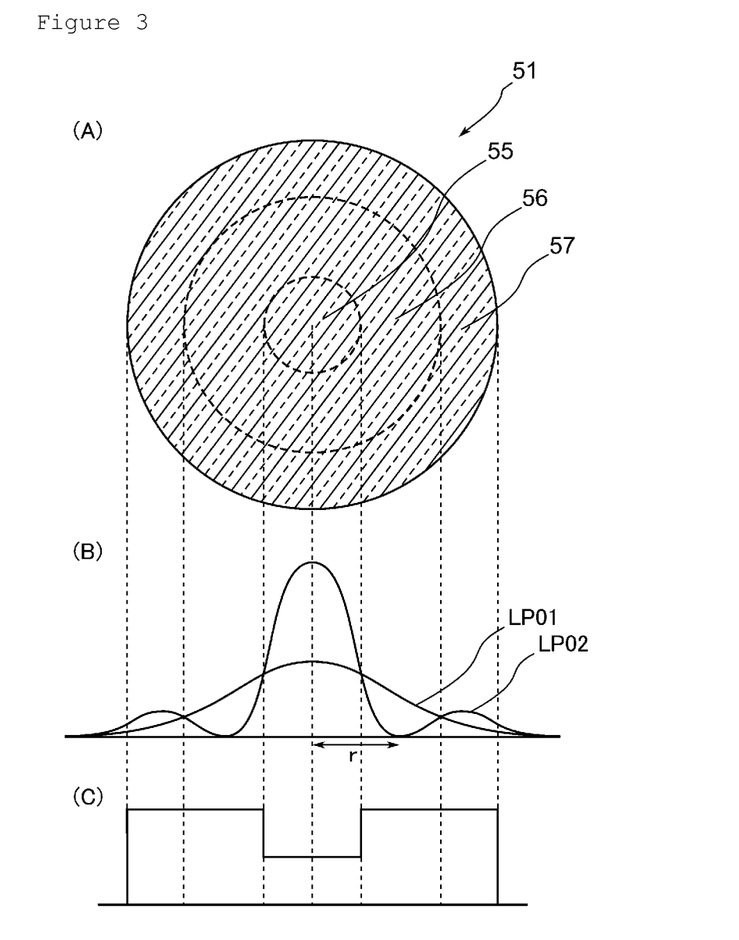
FIG. 3 is a view showing a state of a core of the amplification optical fiber shown in FIG. 2.

Next, the core 51 of the amplification optical fiber 50 will be described in further detail. FIG. 3 is a view showing a state of the core 51 of the amplification optical fiber 50 shown in FIG. 2. Specifically, a part (A) of FIG. 3 is a view showing a state of a structure of the core 51 of a cross-section perpendicular to a longitudinal direction of the amplification optical fiber 50. A part (B) of FIG. 3 is a view showing intensity distribution of LP01 mode and LP02 mode when the LP01 mode and the LP02 mode propagating through the core 51 are normalized by powers thereof. A part (C) of FIG. 3 is a view showing concentration distribution of active element doped into the core 51.

As shown in the part (B) of FIG. 3, the intensity of light of LP02 mode becomes zero at positions having a distance r from the center of the core 51 shown in the part (A) of FIG. 3. LP02 mode exhibits an intensity distribution having a maximum intensity at the center of the core 51. On the other hand, LP01 mode also exhibits an intensity distribution having a maximum intensity at the center of the core 51, but the ratio of the intensity to an intensity at the positions at the distance r from the center of the core 51 is not as high as that of LP02 mode. When LP01 mode and LP02 mode propagating through the core are normalized by powers thereof, LP01 mode has an intensity lower than that of LP02 mode at the center of the core 51. A region which is the neighborhood of the center of the core 51 and in which LP01 mode has a lower intensity than LP02 mode is referred to as a central region 55.

A region which surrounds the central region 55 and in which LP01 mode has a higher intensity than LP02 mode is referred to as a medium region 56. The medium region 56 is distributed in a ring shape on a cross-section of the core 51 as shown in the part (A) of FIG. 3.

A region which surrounds the medium region 56 and in which LP01 mode has a lower intensity than LP02 mode is referred to as an outer circumference region 57. When LP01 mode and LP02 mode propagating through the core 51 are normalized by powers thereof, a diameter of the central region 55 is 8 μm, and an outer diameter of the medium region 56 is 22 μm in the case where the diameter of the core 51 is set to 30 μm as described above, for example.

As shown in the part (C) of FIG. 3, in the amplification optical fiber 50 according to the embodiment, active element Yb is doped into whole of the core 51, but is doped at a lower concentration into the central region including the center of the core 51 than the medium region 56 including a position at which the intensity of light of LP02 mode becomes zero (at the distance r from the center of the core 51). In other words, in the core 51, active element Yb is doped at a higher concentration at the positions where an intensity of LP02 mode becomes zero than the concentration in the central region 55 of the core 51. The active element Yb is doped at 1.0 wt % into silica at the center of the core 51, and doped at 2.0 wt % into silica in the medium region 56 including the position at which the intensity of light of LP02 mode becomes zero (at the distance r from the center of the core 51) and the outer circumference region 57, for example.

Next, an operation of the optical fiber amplifier 100 will be described.

First, light having a wavelength of 1070 μm from the seed light source 10 is output through the single mode fiber 15. At this time, according to the configuration of the single mode fiber 15 described above, only LP01 mode propagates therethrough. The light of LP01 mode propagating through the single mode fiber 15 is input to the optical combiner 30.

The pumping light source 20 outputs pumping light for pumping active element Yb doped into the core 51 of the amplification optical fiber 50. The wavelength at this time is set to 915 μm as described above, for example. The pumping light output from the pumping light source 20 then propagates through the multi mode fibers 22 and input to the optical combiner 30.

The seed light and the pumping light input to the optical combiner 30 are input to the amplification optical fiber 50, the seed light then propagates through the core 51 of the amplification optical fiber 50, and the pumping light propagates through the clad 52 and the core 51 of the amplification optical fiber 50. The seed light is input mainly as LP01 mode, but the core 51 of the amplification optical fiber 50 can allow light having the wavelength of the seed light to propagate as LP01 mode and LP02 mode. Therefore, the input LP01 mode excites LP02 mode and the seed light propagates as LP01 mode and LP02 mode. When the pumping light passes through the core 51, active element Yb doped into the core 51 is pumped. The pumped active element Yb causes a stimulated emission by the seed light and the seed light of LP01 mode and the LP02 mode is amplified by the stimulated emission.

At this time, the concentration of active element Yb at the position in the core 51 where the intensity of light of LP02 mode becomes zero (at the distance r from the center of the core 51) is set higher than the concentration of active element Yb at the center of the core 51. At the positions where the intensity of light of LP02 mode becomes zero, light of LP01 mode does not have an intensity of zero but has a predetermined intensity. At the position where the intensity of light of LP02 mode becomes zero (at the distance r from the center of the core 51), the stimulated emission is also caused so that light of LP01 mode is amplified. On the other hand, at the position at the distance r from the center of the core 51, the intensity of light of LP02 mode is zero so that light of LP02 mode does not cause stimulated emission, and thus is not amplified. The active element Yb at the position where the intensity of light of LP02 mode becomes zero is not stimulated to be emitted by light of LP02 mode so that only light of LP01 mode is effectively amplified.

At the center of the core 51, the concentration of active element Yb is lower than that at the position where the intensity of light of LP02 mode becomes zero, and thus amplification of light in the region is suppressed compared to the amplification at the position where the intensity of light of LP02 mode becomes zero.

As described above, because of the relation between amplification factors of LP01 mode and LP02 mode at the center of the core 51 and the positions where the intensity of light of LP02 mode becomes zero, light of LP01 mode is more highly amplified than that of LP02 mode. Therefore, light of LP01 mode can be effectively amplified.

Specifically, the amplification optical fiber 50 according to the embodiment can output light including light of LP01 mode having a higher intensity than light of LP02 so as to be of higher beam quality compared to a fiber having the core 51 doped with active element Yb at uniform concentration.

Therefore, in the amplification optical fiber 50 according to the embodiment, light output in which all modes are combined has almost the same intensity compared to the fiber having the core 51 doped with active element Yb at uniform concentration and amplification of LP02 mode is suppressed, and thus the power of pumping light can contribute more to amplification of LP01 so that light including light of LP01 mode having a higher intensity and of high beam quality can be output.

Accordingly, the amplification optical fiber 50 can output light of high beam quality compared to a fiber having the core 51 doped with active element Yb at uniform concentration. Therefore, the optical fiber amplifier 100 according to the embodiment using such an amplification optical fiber 50 can output light of high beam quality.

In addition, in the embodiment, the amplification optical fiber 50 is configured not to allow higher-order modes of LP03 or higher to propagate therethrough so that light of high beam quality can be output.

In the optical fiber amplifier 100 according to the embodiment, since single mode light of LP01 mode is input to the amplification optical fiber 50 as seed light, LP01 mode is highly amplified compared to the case of a fiber having the core 51 doped with active element Yb at uniform concentration resulting in LP02 mode amplified at the highest amplification factor. Therefore, light of high beam quality can be output.

Second Embodiment

Figure 4:
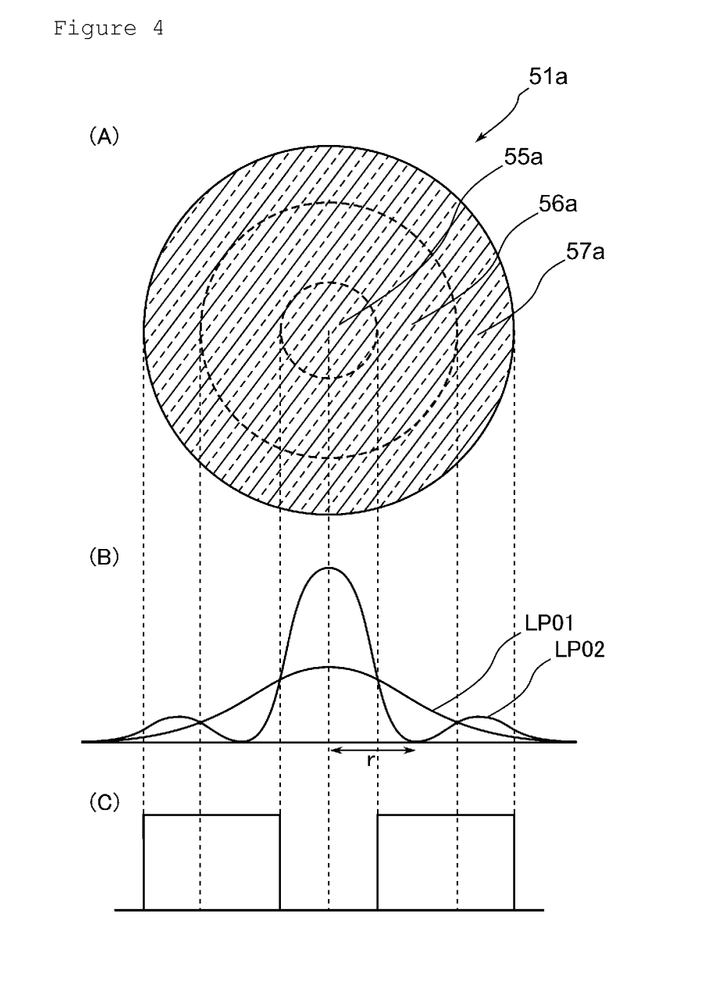
FIG. 4 is a view showing a state of a core of an amplification optical fiber according to a second embodiment of the invention.

Next, a second embodiment of the invention will be described in detail referring to FIG. 4. Here, components that are identical or similar to those in the first embodiment are indicated by the same reference numerals and the same explanation will not be repeated unless otherwise particularly mentioned. FIG. 4 is a view showing a state of a core of an amplification optical fiber according to the second embodiment of the invention, and corresponding to FIG. 3 in the first embodiment.

As shown in a part (A) of FIG. 4, in the amplification optical fiber according to the embodiment, a core 51a is used instead of the core 51 of the first embodiment. As shown in a part (C) of FIG. 4, a medium region 56a and an outer circumference region 57a of the core 51a are configured similarly to the medium region 56 and the outer circumference region 57 of the core 51 of the amplification optical fiber 50 according to the first embodiment. The core 51a of the amplification optical fiber according to the embodiment is different from the core 51 of the amplification optical fiber 50 according to the first embodiment in that active element is not doped into a central region 55a.

With the amplification optical fiber according to the embodiment, since the central region 55a of the core 51a is not doped with active element, light is not amplified in the central region 55a in which an intensity of LP02 mode in light input to the amplification optical fiber is high. Similarly to the first embodiment, at the positions where the intensity of light of LP02 mode becomes zero (at the distance r from the center of the core 51a), light of only LP01 mode is amplified and light of LP02 mode is not amplified. Therefore, LP01 mode is amplified more than LP02 mode so that light of higher beam quality can be output. Therefore, by using the amplification optical fiber according to the embodiment, an optical fiber amplifier capable of outputting light of higher beam quality can be provided.

Third Embodiment

Figure 5:
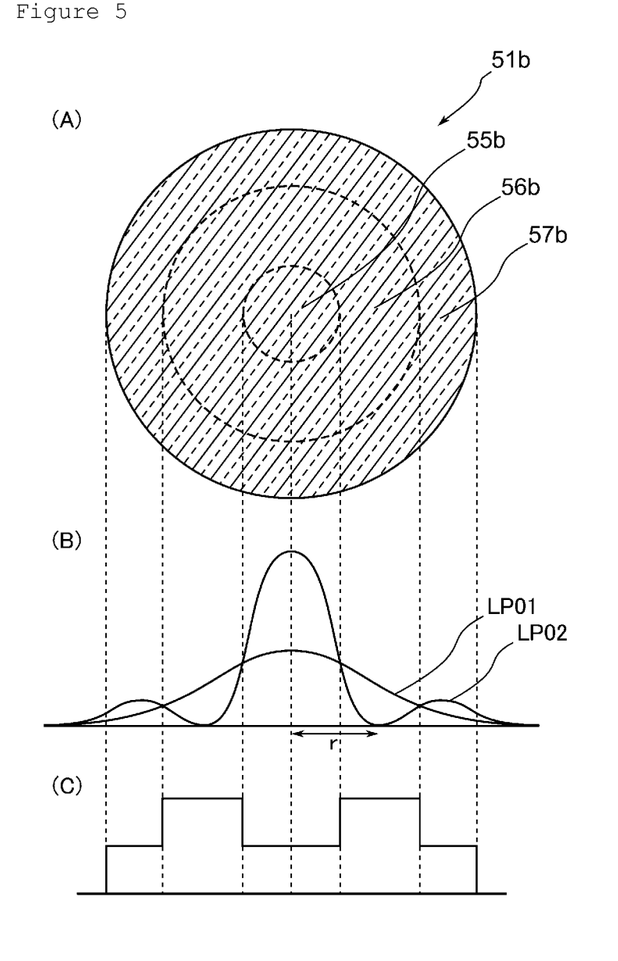
FIG. 5 is a view showing a state of a core of an amplification optical fiber according to a third embodiment of the invention.

Next, a third embodiment of the invention will be described in detail referring to FIG. 5. Here, components that are identical or similar to those in the first embodiment are indicated by the same reference numerals and the same explanation will not be repeated unless otherwise particularly mentioned. FIG. 5 is a view showing a state of a core of an amplification optical fiber according to the third embodiment of the invention, and corresponding to FIG. 3 in the first embodiment.

As shown in a part (A) of FIG. 5, in the amplification optical fiber according to the embodiment, a core 51b is used instead of the core 51 of the first embodiment. As shown in a part (C) of FIG. 5, a central region 55b and a medium region 56b of the core 51b are configured similarly to the central region 55 and the medium region 56 of the core 51 of the amplification optical fiber 50 according to the first embodiment. The core 51b of the amplification optical fiber according to the embodiment is different from the core 51 of the amplification optical fiber 50 according to the first embodiment in that the concentration of active element doped into an outer circumference region 57b is lower than the concentration of active element doped into the medium region 56b. The concentration of active element doped into the outer circumference region 57b is substantially the same as the concentration of active element doped into the central region 55b.

With the amplification optical fiber according to the embodiment, since the concentration of active element doped at the positions where the intensity of light of LP02 mode becomes zero (at the distance r from the center of the core 51b) is higher than the concentration of active element doped into the outer circumference region 57b, amplification of light of LP02 mode is suppressed similarly to the first embodiment. On the other hand, at the distance r from the center of the core 51, light of LP01 mode is amplified highly effectively. Therefore, LP01 mode is amplified more than LP02 mode so that light of higher beam quality can be output. Therefore, by using the amplification optical fiber according to the embodiment, an optical fiber amplifier capable of outputting light of higher beam quality can be provided.

Fourth Embodiment

Figure 6:
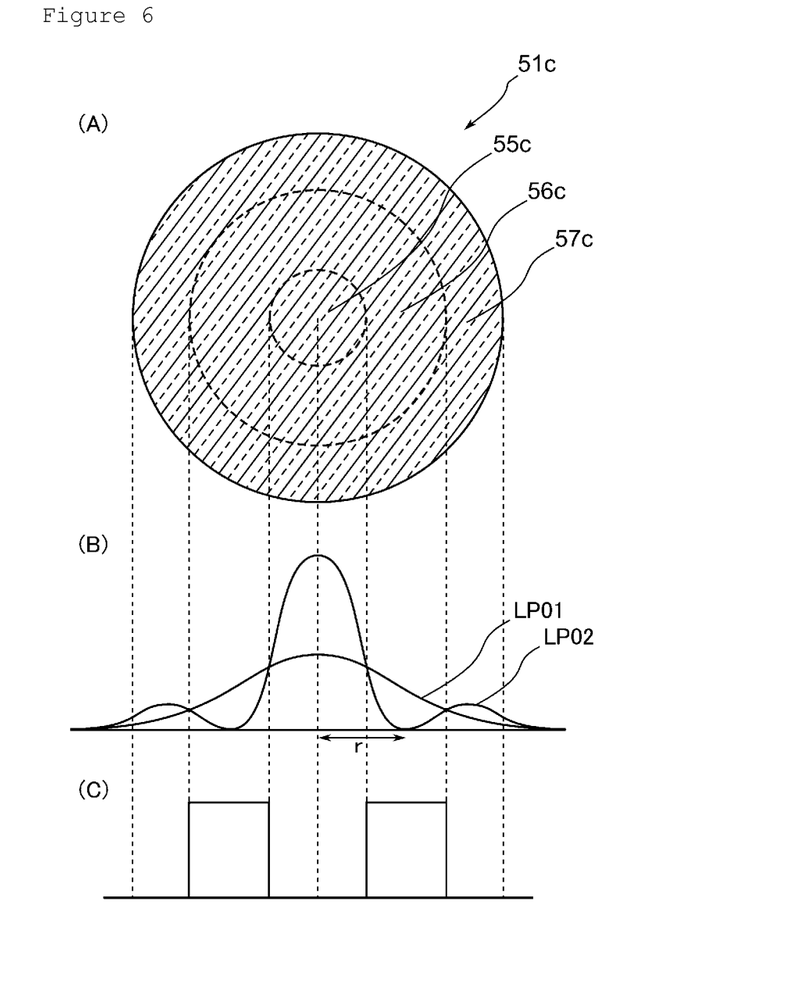
FIG. 6 is a view showing a state of a core of an amplification optical fiber according to a fourth embodiment of the invention.

Next, a fourth embodiment of the invention will be described in detail referring to FIG. 6. Here, components that are identical or similar to those in the first embodiment are indicated by the same reference numerals and the same explanation will not be repeated unless otherwise particularly mentioned. FIG. 6 is a view showing a state of a core of an amplification optical fiber according to the fourth embodiment of the invention, and corresponding to FIG. 3 in the first embodiment.

As shown in a part (A) of FIG. 6, in the amplification optical fiber according to the embodiment, a core 51c is used instead of the core 51 of the first embodiment. As shown in a part (C) of FIG. 6, a medium region 56c of the core 51c is configured similarly to the medium region 56 of the core 51 of the amplification optical fiber 50 according to the first embodiment. The amplification optical fiber according to the embodiment is different from the amplification optical fiber 50 according to the first embodiment in that a central region 55c and an outer circumference region 57c are not doped with active element. In the embodiment, active element is doped only into the medium region 56c.

With the amplification optical fiber of the embodiment, since active element is doped only into the medium region 56c including the position at which the intensity of light of LP02 mode becomes zero (at the distance r from the center of the core 51c), light is not amplified in the central region 55c or the outer circumference region 57c where the intensity of LP02 mode is high. Specifically, only in the medium region 56c where the intensity of LP01 mode is high, light is amplified. Therefore, LP01 mode is amplified more than LP02 mode so that light of higher beam quality can be output. Therefore, by using the amplification optical fiber according to the embodiment, an optical fiber amplifier capable of outputting light of higher beam quality can be provided.

Fifth Embodiment

Figure 7:
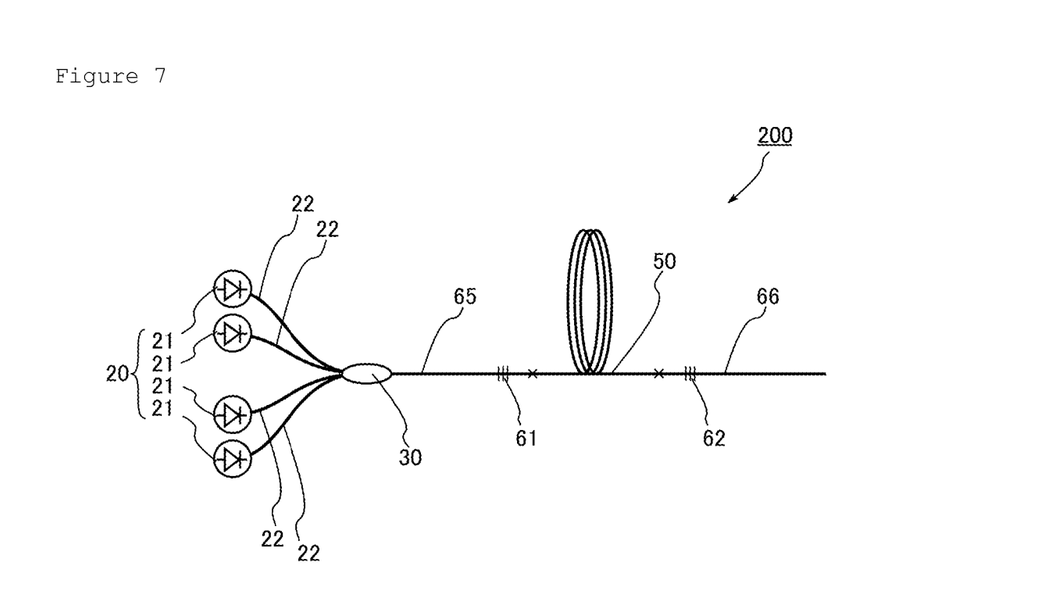
FIG. 7 is a view showing a resonator according to a fifth embodiment of the invention.

Next, a fifth embodiment of the invention will be described in detail referring to FIG. 7. Here, components that are identical or similar to those in the first embodiment are indicated by the same reference numerals and the same explanation will not be repeated unless otherwise particularly mentioned. FIG. 7 is a view showing a resonator according to the fifth embodiment of the invention.

As shown in FIG. 7, a resonator 200 according to the embodiment includes, as main components: a pumping light source 20; an amplification optical fiber 50; an optical combiner 30; a double clad fiber 65 provided between the amplification optical fiber 50 and the optical combiner 30; a first FBG 61 provided on the double clad fiber 65; a multi mode fiber 66 provided on the amplification optical fiber 50 on a side opposite to the double clad fiber 65; and a second FBG 62 provided on the multi mode fiber 66.

The double clad fiber 65 is configured to have a cross-section perpendicular to a longitudinal direction similar to that of the amplification optical fiber, and includes: a core; a clad coating the core; and an outer clad coating the clad. The core, the clad, and the outer clad of the double clad fiber 65 are configured to have outer diameters, refractive indexes, and the like substantially the same as those of the core, the clad, and the outer clad of the amplification optical fiber 50, and the double clad fiber 65 allows LP01 mode and LP02 mode to propagate therethrough similarly to the amplification optical fiber 50. However, the core of the double clad fiber 65 is not doped with active element. One end of the double clad fiber 65 is connected to the optical combiner 30 similarly to that the amplification optical fiber 50 is connected to the optical combiner 30 in the first embodiment so that the core of the multi mode fiber 22 and the clad of the double clad fiber 65 are optically connected. The other end of the double clad fiber 65 is connected to the amplification optical fiber 50, the core of the double clad fiber 65 and the core 51 of the amplification optical fiber 50 are connected, and the clad of the double clad fiber 65 and the clad 52 of the amplification optical fiber 50 are connected.

On the core of the double clad fiber 65, the first FBG 61 is provided. Accordingly, the first FBG 61 is provided on one side of the amplification optical fiber 50. The first FBG 61 includes high refractive index portions repeatedly provided at a regular interval along the longitudinal direction of the double clad fiber 65, and is configured to reflect light having at least a part of wavelengths in light emitted by active element that is pumped in the amplification optical fiber 50 by adjusting the interval. In a case where active element is Yb as described above, the first FBG 61 is configured to have a reflectance of 100%, for example when reflecting light having a wavelength of 1070 nm, for example.

In the multi mode fiber 66 provided on the amplification optical fiber 50 on the side opposite to the double clad fiber 65, a diameter of the core and the refractive indexes of the core and the clad are set such that the multi mode fiber 66 allows LP01 mode and LP02 mode to propagate therethrough similarly to the amplification optical fiber 50. The multi mode fiber 66 has one end connected to the amplification optical fiber 50 and the other end connected to nothing so as to be a free end. The core 51 of the amplification optical fiber 50 is connected to the core of the multi mode fiber 66.

On the core of the multi mode fiber 66, the second FBG 62 is provided. Accordingly, the second FBG 62 is provided on the other side of the amplification optical fiber 50. The second FBG 62 includes high refractive index portions repeatedly provided at a regular interval along the longitudinal direction of the multi mode fiber 66, and is configured to reflect light having the same wavelength as light reflected by the first FBG 61 at a lower reflectance than the first FBG 61, and may be configured to reflect light having the same wavelength as light reflected by the first FBG 61 at the reflectance of 50%, for example.

In such a resonator 200, pumping light output from the respective laser diodes 21 of the pumping light source 20 is input to the clad of the double clad fiber 65 at the optical combiner 30, and then is input from the clad of the double clad fiber 65 to the clad of the amplification optical fiber 50. Similarly to the first embodiment, active element doped into the core 51 of the amplification optical fiber 50 is pumped. The pumped active element then emits spontaneous emission light of a specific wavelength. The spontaneous emission light at this time may be light having the center wavelength of 1070 nm and a constant band, for example. The spontaneous emission light propagates through the core 51 of the amplification optical fiber 50 and reflected by the first FBG 61 provided on the core of the double clad fiber 65, and the reflected light is reflected by the second FBG 62 so as to cause optical resonance. Light is amplified while propagating through the core 51 of the amplification optical fiber 50, and a part of the light transmits through the second FBG so as to be output from the multi mode fiber 66.

Also in the embodiment, since light of LP01 mode is more highly amplified than that of LP02 while light propagates through the core 51 of the amplification optical fiber 50, light including light of LP01 mode having a higher intensity than light of LP02, which is light of higher beam quality can be output compared to a case where a fiber having the core 51 doped with active element Yb at uniform concentration is used.

Although an example in which the amplification optical fiber 50 according to the first embodiment is used as an amplification optical fiber has been described in the embodiment, the amplification optical fiber 50 described in the second to fourth embodiments may be used.

Although the invention has been described above by reference to the first to fifth embodiments as examples, the invention is not limited thereto.

For example, in the third embodiment, active element may not be doped into the outer circumference region 57b. Also with such a configuration, LP01 mode is amplified at a higher amplification factor than LP02 mode in input light, and thus light of high beam quality can be output.

Alternatively, in the third embodiment, concentrations of active element doped into the central region 55b and the outer circumference region 57b may be different from each other.

In the first to fourth embodiments, the amplification optical fiber has been configured not to allow higher-order modes of LP03 or higher in light input to the core to propagate therethrough, but may be configured to allow higher-order modes of LP03 and higher to propagate therethrough.

In the first to fourth embodiments, an example of forward exciting configuration in which pumping light is input from an end surface of the amplification optical fiber opposite to the output end side is described, but backward exciting configuration in which the optical combiner for pumping is provided on the output end side of the amplification optical fiber and pumping light is input from the end surface of the amplification optical fiber on the output end side may be used.

As an optical fiber connected to the seed light source 10, a multi mode fiber may be used so as to input multi mode light into the amplification optical fiber. At this time, a multi mode optical fiber is used as a fiber for propagation of seed light of the optical combiner, and the multi mode fiber connected to the seed light source and the fiber for propagation of seed light of the optical combiner are fusion-connected while their center axes are substantially matched. Accordingly, the multi mode fiber allows an axially symmetric mode to propagate so as to make seed light input to the amplification optical fiber to be light including an axially symmetric mode. Accordingly, the seed light input to the amplification optical fiber only includes an axially symmetric higher-order mode other than LP01 mode. Therefore, light of high beam quality can be output that can be focused more easily compared to a case where the seed light input to the amplification optical fiber includes an axially asymmetric higher-order mode. A multi mode fiber that allows LP01 mode and LP02 mode to propagate but does not allow higher-order modes of LP03 or higher, for example, may be used as an example of such a multi mode fiber. Such a multi mode fiber may be configured by setting the diameter of the core to 30 μm and the difference in the relative refractive index between the core and the clad to 0.15% in the case where the wavelength of light propagating through the core is 1070 nm.

The optical fiber amplifier 100 or the resonator 200 described in the embodiments can be used as a fiber laser device as it is.

EXAMPLES

Hereinafter, the invention will be more concretely described with examples and a comparative example, but the invention is not limited thereto.

First Example

In order to verify beam quality of output light through a simulation, an amplification optical fiber similar to that of the first embodiment was assumed. In the amplification optical fiber according to the example, the core was configured to have a diameter of 30 μm, the clad was configured to have an outer diameter of 420 μm, and the outer clad was configured to have an outer diameter of 440 μm. The difference in relative refractive index between the core and the clad was set to 0.15%. Throughout the examples to be described hereinafter, respective amplification optical fibers are configured to have lengths making the amplification to be most effective under the condition of maximum pumping light power.

When light having a wavelength of 1070 nm is input to such an amplification optical fiber and LP01 mode and LP02 mode in the light are respectively normalized by powers thereof, LP02 mode has a higher intensity than LP01 mode in the central region having a diameter of 4 μm in a radial direction of the core, LP01 mode has a higher intensity than LP02 in the medium region having an inner diameter of 4 μm and an outer diameter of 11 μm, and LP02 mode has a higher intensity than LP01 mode in the outer circumference region outside the medium region.

Therefore, the central region was doped with Yb at 1 wt %, and the medium region and the outer circumference region were doped with Yb at 2 wt %.

Second Example

A second example was configured similarly to the first example except that an amplification optical fiber similar to that of the second embodiment was assumed and the central region was not doped with Yb.

Third Example

A third example was configured similarly to the first example except that an amplification optical fiber similar to that of the third embodiment was assumed and the outer circumference region was doped with Yb at 1 wt %.

Fourth Example

A fourth example was configured similarly to the first example except that an amplification optical fiber similar to that of the fourth embodiment was assumed and the central region and the outer circumference region were not doped with Yb.

Fifth Example

A fifth example was configured similarly to the third example except that the concentration of Yb doped into the central region was set to 1.6 wt % and the concentration of Yb doped into the outer circumference region was set to 1.6 wt %.

First Comparative Example

A first comparative example was configured similarly to the first example except that Yb was doped into whole of the core at uniform concentration of 2.0 wt %.

Figure 8:
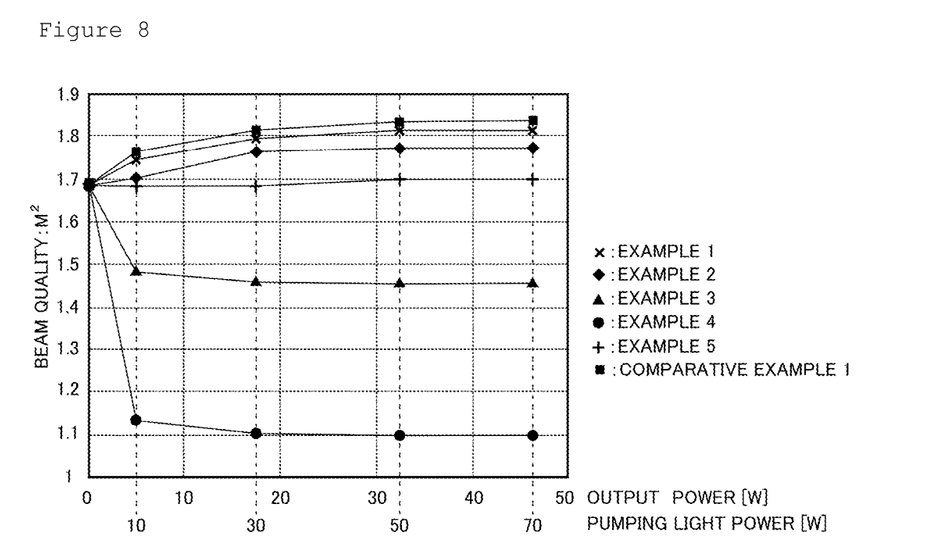
FIG. 8 is a view showing beam quality of output light in cases where seed light including LP01 mode with a power of 70% and LP02 mode with a power of 30% is input to the amplification optical fibers according to first to fifth examples and a first comparative example.

Next, an output power and beam quality ($M^2$) of output light in each of cases where seed light including LP01 mode with a power of 70% and LP02 mode with a power of 30% and having an intensity of 200 mW as a whole power was input to the amplification optical fibers according to the first to fifth examples and the first comparative example, and pumping light was input while changing the power of the pumping light to 10 W, 30 W, 50 W, and 70 W were obtained by calculation. The beam quality $M^2$ was defined by the following equation using a wavelength λ, a spread angle Θ of the output light, and a beam diameter D.

$$M^2 = \frac{\Theta \times D \times \pi}{4 \times \lambda}$$

The result is shown in FIG. 8. As shown in FIG. 8, output powers were not different for any powers of pumping light in the first to fifth examples and the first comparative example. In the first example, $M^2$ indicating beam quality has a lower value for any powers of pumping light compared to the first comparative example, whereby it was confirmed that light of high beam quality is output in the first example. The result indicated that light of higher beam quality is output in the second example, light of still higher beam quality is output in the fifth example, light of even higher beam quality is output in the third example, and light of the highest beam quality is output in the fourth example.

Figure 9:
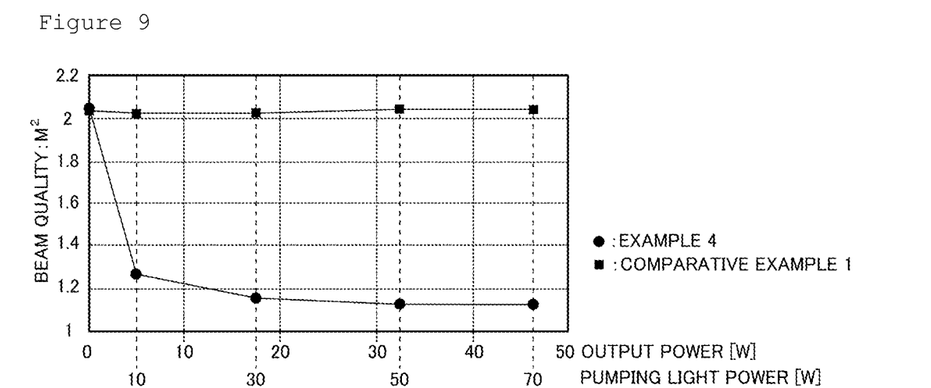
FIG. 9 is a view showing beam quality of output light in cases where seed light including LP01 mode and LP02 mode both with a power of 50% is input to the amplification optical fibers according to the fourth example and the first comparative example.

Next, an output power and beam quality ($M^2$) of output light in each of cases where seed light including LP01 mode and LP02 mode both with a power of 50% and having an intensity of 200 mW was input to the amplification optical fiber of the fourth example and the amplification optical fiber of the first comparative example, and pumping light was input while changing the power of the pumping light to 10 W, 30 W, 50 W, and 70 W were obtained by calculation. The result is shown in FIG. 9. As shown in FIG. 9, powers of pumping light in the fourth example and the first comparative example were not much different. The result indicated that light of higher beam quality is output in the fourth example compared to the first comparative example.

Figure 10:
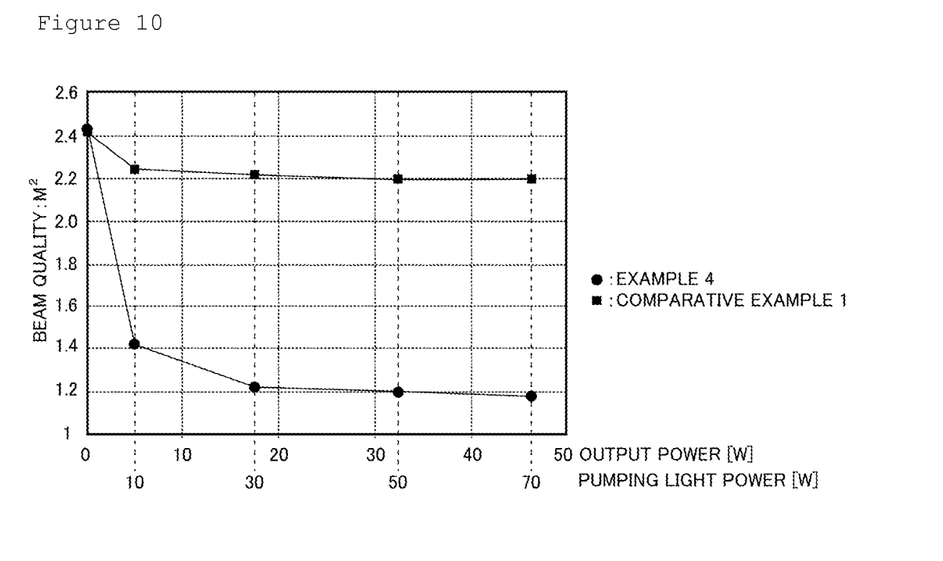
FIG. 10 is a view showing beam quality of output light in cases where seed light including LP01 mode with a power of 30% and LP02 mode with a power of 70% is input to the amplification optical fibers according to the fourth example and the first comparative example.

Next, an output power and beam quality ($M^2$) of output light in each of cases where seed light including LP01 mode with a power of 30% and LP02 mode with a power of 70% and having an intensity of 200 mW as a whole power was input to the amplification optical fiber of the fourth example and the amplification optical fiber of the first comparative example, and pumping light was input while changing the power of the pumping light to 10 W, 30 W, 50 W, and 70 W were obtained by calculation. The result is shown in FIG. 10. As shown in FIG. 10, powers of pumping light in the fourth example and the first comparative example were not much different. The result indicated that light of higher beam quality is output in the fourth example compared to the first comparative example.

From the results, it was confirmed that in the case of an amplification optical fiber in which active element is doped into a region where LP01 mode has a higher intensity than LP02 mode at a higher concentration compared to the central region of the core when LP01 mode and LP02 mode in the light input to the core are respectively normalized by powers thereof, which is the invention, LP01 mode is amplified at a higher amplification factor than LP02 mode, and thus light of high beam quality can be output. In addition, it was confirmed that LP01 mode is amplified at a higher amplification factor than LP02 mode, and thus light of high beam quality can be output regardless of ratio between the powers of LP01 mode and LP02 mode in light propagating through the amplification optical fiber.

As described above, in the amplification optical fiber 50 according to the invention, LP01 mode is more highly amplified than LP02 mode compared to a fiber having the core 51 doped with active element Yb at uniform concentration, and thus light of LP01 mode having a higher intensity is output, compared to a fiber having the core 51 doped with active element Yb at uniform concentration.

Accordingly, the amplification optical fiber 50 can output light of higher beam quality compared to a fiber having the core 51 doped with active element Yb at uniform concentration. Therefore, the optical fiber amplifier 100 according to the invention using such an amplification optical fiber 50 can output light of high beam quality.

INDUSTRIAL APPLICABILITY

According to the invention, an amplification optical fiber, and an optical fiber amplifier and a resonator using the same capable of outputting light of high beam quality even when a higher-order mode that is axially symmetric is excited in addition to LP01 mode can be provided.

The invention claimed is:

1. An amplification optical fiber comprising:
a core;
a clad coating the core; and
an outer clad coating the clad,
wherein the core has a larger refractive index than the clad,
the core allows light having a predetermined wavelength to propagate in at least LP01 mode and LP02 mode, and
in the core, active element that stimulates to emit light of the predetermined wavelength is doped at a higher concentration at a position where an intensity of the LP02 mode becomes zero than center of the core.

2. An amplification optical fiber comprising:
a core;
a clad coating the core; and
an outer clad coating the clad,
wherein the core has a larger refractive index than the clad,
the core allows light having a predetermined wavelength to propagate in at least LP01 mode and LP02 mode, and
in the core, active element that stimulates to emit light of the predetermined wavelength is doped at a lower concentration at center of the core than a position where an intensity of the LP02 mode becomes zero.

3. The amplification optical fiber according to claim 1 or 2, wherein the active element is not doped into the center of the core.

4. The amplification optical fiber according to claim 1 or 2, wherein the active element is doped at a lower concentration at an outer circumference region of the core than a position where an intensity of the LP02 mode becomes zero.

5. The amplification optical fiber according to claim 4, wherein the active element is not doped into the outer circumference region of the core.

6. The amplification optical fiber according to claim 3, wherein the active element is doped at a lower concentration at an outer circumference region of the core than a position where an intensity of the LP02 mode becomes zero.

7. The amplification optical fiber according to claim 6, wherein the active element is not doped into the outer circumference region of the core.

8. The amplification optical fiber according to claim 1 or 2, wherein the active element is doped into a region where the LP01 mode has a higher intensity than the LP02 mode at a higher concentration compared to a region where the LP01 mode has a lower intensity than the LP02 mode when the LP01 mode and the LP02 mode are respectively normalized by powers thereof.

9. The amplification optical fiber according to claim 1 or 2, wherein the core does not allow higher-order mode of LP03 or higher in light having the predetermined wavelength.

10. The amplification optical fiber according to claim 3, wherein the core does not allow higher-order mode of LP03 or higher in light having the predetermined wavelength.

11. The amplification optical fiber according to claim 4, wherein the core does not allow higher-order mode of LP03 or higher in light having the predetermined wavelength.

12. The amplification optical fiber according to claim 5, wherein the core does not allow higher-order mode of LP03 or higher in light having the predetermined wavelength.

13. The amplification optical fiber according to claim 6, wherein the core does not allow higher-order mode of LP03 or higher in light having the predetermined wavelength.

14. The amplification optical fiber according to claim 7, wherein the core does not allow higher-order mode of LP03 or higher in light having the predetermined wavelength.

15. The amplification optical fiber according to claim 8, wherein the core does not allow higher-order mode of LP03 or higher in light having the predetermined wavelength.

16. An optical fiber amplifier comprising:
an amplification optical fiber having a core, a clad coating the core, and an outer clad coating the clad;
a seed light source configured to input seed light including LP01 mode to the amplification optical fiber; and
a pumping light source configured to output pumping light that pumps the active element of the amplification optical fiber,
wherein the core has a larger refractive index than the clad,
the core allows light having a predetermined wavelength to propagate in at least LP01 mode and LP02 mode, and
in the core, active element that stimulates to emit light of the predetermined wavelength is doped at a higher concentration at a position where an intensity of the LP02 mode becomes zero than center of the core.

17. An optical fiber amplifier comprising:
an amplification optical fiber having a core, a clad coating the core, and an outer clad coating the clad;
a seed light source configured to input seed light including LP01 mode to the amplification optical fiber; and
a pumping light source configured to output pumping light that pumps the active element of the amplification optical fiber,
wherein the core has a larger refractive index than the clad,
the core allows light having a predetermined wavelength to propagate in at least LP01 mode and LP02 mode, and
in the core, active element that stimulates to emit light of the predetermined wavelength is doped at a lower concentration at center of the core than a position where an intensity of the LP02 mode becomes zero.

18. The optical fiber amplifier according to claim 16 or 17, wherein the seed light input to the amplification optical fiber excites only an axially symmetric mode in the amplification optical fiber.

19. The optical fiber amplifier according to claim 18, wherein the seed light input to the amplification optical fiber is single mode light.

20. The optical fiber amplifier according to claim 16 or 17, wherein the active element is not doped into the center of the core.

21. The optical fiber amplifier according to claim 20, wherein the seed light input to the amplification optical fiber excites only an axially symmetric mode in the amplification optical fiber.

22. The optical fiber amplifier according to claim 21, wherein the seed light input to the amplification optical fiber is single mode light.

23. The optical fiber amplifier according to claim 16 or 17, wherein the active element is doped at a lower concentration at an outer circumference region of the core than a position where an intensity of the LP02 mode becomes zero.

24. The optical fiber amplifier according to claim 23, wherein the seed light input to the amplification optical fiber excites only an axially symmetric mode in the amplification optical fiber.

25. The optical fiber amplifier according to claim 24, wherein the seed light input to the amplification optical fiber is single mode light.

26. The optical fiber amplifier according to claim 23, wherein the active element is not doped into the outer circumference region of the core.

27. The optical fiber amplifier according to claim 26, wherein the seed light input to the amplification optical fiber excites only an axially symmetric mode in the amplification optical fiber.

28. The optical fiber amplifier according to claim 27, wherein the seed light input to the amplification optical fiber is single mode light.

29. The optical fiber amplifier according to claim 20, wherein the active element is doped at a lower concentration at an outer circumference region of the core than a position where an intensity of the LP02 mode becomes zero.

30. The optical fiber amplifier according to claim 29, wherein the seed light input to the amplification optical fiber excites only an axially symmetric mode in the amplification optical fiber.

31. The optical fiber amplifier according to claim 30, wherein the seed light input to the amplification optical fiber is single mode light.

32. The optical fiber amplifier according to claim 29, wherein the active element is not doped into the outer circumference region of the core.

33. The optical fiber amplifier according to claim 32, wherein the seed light input to the amplification optical fiber excites only an axially symmetric mode in the amplification optical fiber.

34. The optical fiber amplifier according to claim 33, wherein the seed light input to the amplification optical fiber is single mode light.

35. The optical fiber amplifier according to claim 16 or 17, wherein the active element is doped into a region where the LP01 mode has a higher intensity than the LP02 mode at a higher concentration compared to a region where the LP01 mode has a lower intensity than the LP02 mode when the LP01 mode and the LP02 mode are respectively normalized by powers thereof.

36. The optical fiber amplifier according to claim 35, wherein the seed light input to the amplification optical fiber excites only an axially symmetric mode in the amplification optical fiber.

37. The optical fiber amplifier according to claim 36, wherein the seed light input to the amplification optical fiber is single mode light.

38. The optical fiber amplifier according to claim 16 or 17, wherein the core does not allow higher-order mode of LP03 or higher in light having the predetermined wavelength.

39. The optical fiber amplifier according to claim 38, wherein the seed light input to the amplification optical fiber excites only an axially symmetric mode in the amplification optical fiber.

40. The optical fiber amplifier according to claim 39, wherein the seed light input to the amplification optical fiber is single mode light.

41. The optical fiber amplifier according to claim 20, wherein the core does not allow higher-order mode of LP03 or higher in light having the predetermined wavelength.

42. The optical fiber amplifier according to claim 41, wherein the seed light input to the amplification optical fiber excites only an axially symmetric mode in the amplification optical fiber.

43. The optical fiber amplifier according to claim 42, wherein the seed light input to the amplification optical fiber is single mode light.

44. The optical fiber amplifier according to claim 23, wherein the core does not allow higher-order mode of LP03 or higher in light having the predetermined wavelength.

45. The optical fiber amplifier according to claim 44, wherein the seed light input to the amplification optical fiber excites only an axially symmetric mode in the amplification optical fiber.

46. The optical fiber amplifier according to claim 45, wherein the seed light input to the amplification optical fiber is single mode light.

47. The optical fiber amplifier according to claim 26, wherein the core does not allow higher-order mode of LP03 or higher in light having the predetermined wavelength.

48. The optical fiber amplifier according to claim 47, wherein the seed light input to the amplification optical fiber excites only an axially symmetric mode in the amplification optical fiber.

49. The optical fiber amplifier according to claim 48, wherein the seed light input to the amplification optical fiber is single mode light.

50. The optical fiber amplifier according to claim 29, wherein the core does not allow higher-order mode of LP03 or higher in light having the predetermined wavelength.

51. The optical fiber amplifier according to claim 50, wherein the seed light input to the amplification optical fiber excites only an axially symmetric mode in the amplification optical fiber.

52. The optical fiber amplifier according to claim 51, wherein the seed light input to the amplification optical fiber is single mode light.

53. The optical fiber amplifier according to claim 32, wherein the core does not allow higher-order mode of LP03 or higher in light having the predetermined wavelength.

54. The optical fiber amplifier according to claim 53, wherein the seed light input to the amplification optical fiber excites only an axially symmetric mode in the amplification optical fiber.

55. The optical fiber amplifier according to claim 54, wherein the seed light input to the amplification optical fiber is single mode light.

56. The optical fiber amplifier according to claim 35, wherein the core does not allow higher-order mode of LP03 or higher in light having the predetermined wavelength.

57. The optical fiber amplifier according to claim 56, wherein the seed light input to the amplification optical fiber excites only an axially symmetric mode in the amplification optical fiber.

58. The optical fiber amplifier according to claim 57, wherein the seed light input to the amplification optical fiber is single mode light.

59. A resonator comprising:
the amplification optical fiber having a core, a clad coating the core, and an outer clad coating the clad;
a pumping light source configured to output pumping light that pumps the active element of the amplification optical fiber;
a first FBG provided on one side of the amplification optical fiber and configured to reflect light having at least a part of wavelengths in light emitted by the active element that is pumped by the pumping light; and a second FBG provided on the other side of the amplification optical fiber and configured to reflect light having the same wavelength as light reflected by the first FBG at a lower reflectance than the first FBG, wherein the core has a larger refractive index than the clad, the core allows light having a predetermined wavelength to propagate in at least LP01 mode and LP02 mode, and in the core, active element that stimulates to emit light of the predetermined wavelength is doped at a higher concentration at a position where an intensity of the LP02 mode becomes zero than center of the core.

60. A resonator comprising:

the amplification optical fiber having a core, a clad coating the core, and an outer clad coating the clad;

a pumping light source configured to output pumping light that pumps the active element of the amplification optical fiber;

a first FBG provided on one side of the amplification optical fiber and configured to reflect light having at least a part of wavelengths in light emitted by the active element that is pumped by the pumping light; and a second FBG provided on the other side of the amplification optical fiber and configured to reflect light having the same wavelength as light reflected by the first FBG at a lower reflectance than the first FBG, wherein the core has a larger refractive index than the clad, the core allows light having a predetermined wavelength to propagate in at least LP01 mode and LP02 mode, and in the core, active element that stimulates to emit light of the predetermined wavelength is doped at a lower concentration at center of the core than a position where an intensity of the LP02 mode becomes zero.

61. The resonator according to claim 59 or 60, wherein the active element is not doped into the center of the core.

62. The resonator according to claim 59 or 60, wherein the active element is doped at a lower concentration at an outer circumference region of the core than a position where an intensity of the LP02 mode becomes zero.

63. The resonator according to claim 62, wherein the active element is not doped into the outer circumference region of the core.

64. The resonator according to claim 61, wherein the active element is doped at a lower concentration at an outer circumference region of the core than a position where an intensity of the LP02 mode becomes zero.

65. The resonator according to claim 64, wherein the active element is not doped into the outer circumference region of the core.

66. The resonator according to claim 59 or 60, wherein the active element is doped into a region where the LP01 mode has a higher intensity than the LP02 mode at a higher concentration compared to a region where the LP01 mode has a lower intensity than the LP02 mode when the LP01 mode and the LP02 mode are respectively normalized by powers thereof.

67. The resonator according to claim 59 or 60, wherein the core does not allow higher-order mode of LP03 or higher in light having the predetermined wavelength.

68. The resonator according to claim 61, wherein the core does not allow higher-order mode of LP03 or higher in light having the predetermined wavelength.

69. The resonator according to claim 62, wherein the core does not allow higher-order mode of LP03 or higher in light having the predetermined wavelength.

70. The resonator according to claim 63, wherein the core does not allow higher-order mode of LP03 or higher in light having the predetermined wavelength.

71. The resonator according to claim 64, wherein the core does not allow higher-order mode of LP03 or higher in light having the predetermined wavelength.

72. The resonator according to claim 65, wherein the core does not allow higher-order mode of LP03 or higher in light having the predetermined wavelength.

73. The resonator according to claim 66, wherein the core does not allow higher-order mode of LP03 or higher in light having the predetermined wavelength.

* * * * *